US008704506B2

(12) United States Patent
Lipka et al.
(10) Patent No.: US 8,704,506 B2
(45) Date of Patent: Apr. 22, 2014

(54) VOLTAGE REGULATOR SOFT-START CIRCUIT PROVIDING REFERENCE VOLTAGE RAMP-UP

(75) Inventors: Ronald J. Lipka, Worcester County, MA (US); Bradley Wright, Larimer County, CO (US)

(73) Assignee: LSI Corporation, San Jose, CA (US)

( * ) Notice: Subject to any disclaimer, the term of this patent is extended or adjusted under 35 U.S.C. 154(b) by 451 days.

(21) Appl. No.: 12/973,098

(22) Filed: Dec. 20, 2010

(65) Prior Publication Data

US 2012/0153924 A1 Jun. 21, 2012

(51) Int. Cl.
*H02M 1/36* (2007.01)

(52) U.S. Cl.
USPC .......................................... 323/303; 323/901

(58) Field of Classification Search
USPC ......... 323/226, 238, 280, 281, 299, 901, 303; 327/143; 363/49
See application file for complete search history.

(56) References Cited

U.S. PATENT DOCUMENTS 5,742,155 A * 4/1998 Susak et al. .................. 323/313
6,344,980 B1 * 2/2002 Hwang et al. ............. 363/21.01
6,515,880 B1 2/2003 Evans et al.
6,731,486 B2 * 5/2004 Holt et al. .................... 361/91.1
7,023,181 B2 * 4/2006 Nakata .......................... 323/313
7,332,831 B2 * 2/2008 Miyagoe ......................... 307/18
8,242,760 B2 * 8/2012 Takagi et al. ................. 323/908

OTHER PUBLICATIONS

Mohammad Al-Shyoukh and Hoi Lee, A compact ramp-based soft-start circuit for voltage regulators, Jul. 2009, IEEE, Transactions on circuits and systems—II : Express briefs, vol. 56, No. 7, p. 535-539.*
M. Al-Shyoukh et al., "A Compact Ramp-Based Soft-Start Circuit for Voltage Regulators," IEEE Transactions on Circuits and Systems II, Jul. 2009, pp. 535-539, vol. 56, No. 7.

* cited by examiner

*Primary Examiner* — Adolf Berhane
*Assistant Examiner* — Jye-June Lee
(74) *Attorney, Agent, or Firm* — Ryan, Mason & Lewis, LLP

(57) ABSTRACT

An improved start-up (soft-start) circuit for use with voltage regulators, and an improved regulator start-up methodology. For example, an apparatus includes a voltage regulator circuit and a start-up circuit operatively coupled to the voltage regulator circuit. The start-up circuit is configured to provide a current signal, during a start-up period, that generates a reference voltage at a reference input of the voltage regulator circuit such that the reference voltage ramps up at a rate substantially equal to a ramp-up rate of a supply voltage coupled to the start-up circuit and the voltage regulator circuit.

20 Claims, 4 Drawing Sheets

K = GAIN OF VOLTAGE REGULATOR $$I_{OUT1} = \frac{V_{DD} - V_{DS(M1)}}{R_2 + R_3}$$

VOLTAGE REGULATOR SOFT-START CIRCUIT PROVIDING REFERENCE VOLTAGE RAMP-UP

FIELD OF THE INVENTION

The present invention relates generally to voltage regulators, and more particularly to an improved soft-start circuit for use with voltage regulators.

BACKGROUND OF THE INVENTION

It is known that when the supply voltage (e.g., VDD) of a voltage regulator ramps up after the source of the supply power is powered on, the regulator output voltage can quickly snap up (i.e., quickly rise) to an intermediate voltage depending on the reference current generator design and/or the regulator design. This snap up condition is problematic if the regulator has a resistor-capacitor (RC) triggered electrostatic discharge (ESD) clamp on its load and if the regulator snaps up fasterthan the RC time constant of the ESD clamp. In this scenario, the ESD clamp will turn on and generate very large currents that can damage the regulator. In another scenario, the ESD clamp turning on will cause no voltage to be output by the regulator.

Existing solutions to the above-described snap-up problem typically use some form of soft-start charging capacitor and current source in order to insure a slow ramp-up of the regulator. However, if the charging capacitor is provided as an external component, then the cost and space requirements of the regulator are disadvantageously increased. On the other hand, if the charging capacitor is provided as an integrated circuit component, then the die area is disadvantageously increased.

It is therefore desirable to avoid the aforementioned excessive current flow during the start-up of a voltage regulator without requiring a charging capacitor.

SUMMARY OF THE INVENTION

Illustrative embodiments of the present invention meet the above-noted and other needs by providing an improved start-up (soft-start) circuit for use with voltage regulators, and an improved regulator start-up methodology.

For example, in accordance with one aspect of the invention, an apparatus comprises a voltage regulator circuit and a start-up circuit operatively coupled to the voltage regulator circuit. The start-up circuit is configured to provide a current signal, during a start-up period, that generates a reference voltage at a reference input of the voltage regulator circuit such that the reference voltage ramps up at a rate substantially equal to a ramp-up rate of a supply voltage coupled to the start-up circuit and the voltage regulator circuit.

The voltage regulator circuit may be configured such that, in response to the ramp up of the reference voltage at the reference input of the voltage regulator circuit, a regulator voltage at an output of the voltage regulator circuit ramps up at a rate substantially equal to the ramp-up rate of the reference voltage.

Further, the apparatus may comprise a reference current generator operatively coupled to the voltage regulator circuit and the start-up circuit and configured to, at a given time during the start-up period, provide a current signal to the voltage regulator circuit and turn off the start-up circuit.

Still further, the apparatus may comprise an overvoltage protection circuit operatively coupled to the output of the voltage regulator circuit, wherein the regulator voltage ramps up at a rate such that the overvoltage protection circuit does not falsely trigger during the start-up period.

In accordance with another aspect of the invention, a soft-start circuit for a voltage regulator comprises: a transistor having a low threshold voltage that turns on initially during a start-up period when a supply voltage starts to ramp up and turns off when a reference current generator turns on; an inverter coupled between the reference current generator and the transistor; a first resistor coupled between an input of the inverter and ground; and a second resistor coupled between the supply voltage and the transistor. An output signal from the inverter is provided to a gate of the transistor turning on the transistor during the start-up period such that current flows thru the second resistor and the transistor and forms the current signal that generates a reference voltage at a reference input of the voltage regulator, and wherein a voltage is generated across the first resistor when the reference current generator turns on thereby turning off the transistor.

Advantageously, techniques of the invention use a slow ramp-up of the regulator voltage to effectively achieve a sufficient time constant without the use of capacitors. Because no capacitors are required, the soft-start circuit of the invention is considered a low area soft-start circuit.

These and other objects, features, and advantages of the present invention will become apparent from the following detailed description of illustrative embodiments thereof, which is to be read in connection with the accompanying drawings.

DETAILED DESCRIPTION OF THE INVENTION

Principles of the invention will be illustrated herein in conjunction with an exemplary voltage regulator architecture. It should be understood, however, that the invention is not limited to use with any particular voltage regulator architecture, and can thus be implemented with a variety of regulator designs other than the ones that are illustratively depicted and described herein.

It is to be understood that the following circuit description is given below with reference to specific terminals, e.g., input, output, first, second, gate, source, and drain, by which a given component is coupled to one or more other components. However, given the functional description herein of each of the components, and their interaction with one another also described in detail herein, one of ordinary skill in the art will realize how each component could be alternatively coupled (i.e., in comparison to what is shown and described in the context of FIG. 1) in order to realize the advantages of the embodiments of the invention. Also, it is to be understood that a transistor terminal designated as a source terminal may function as a drain terminal, and vice versa, depending on how the transistor is connected in the circuit.

Figure 1:
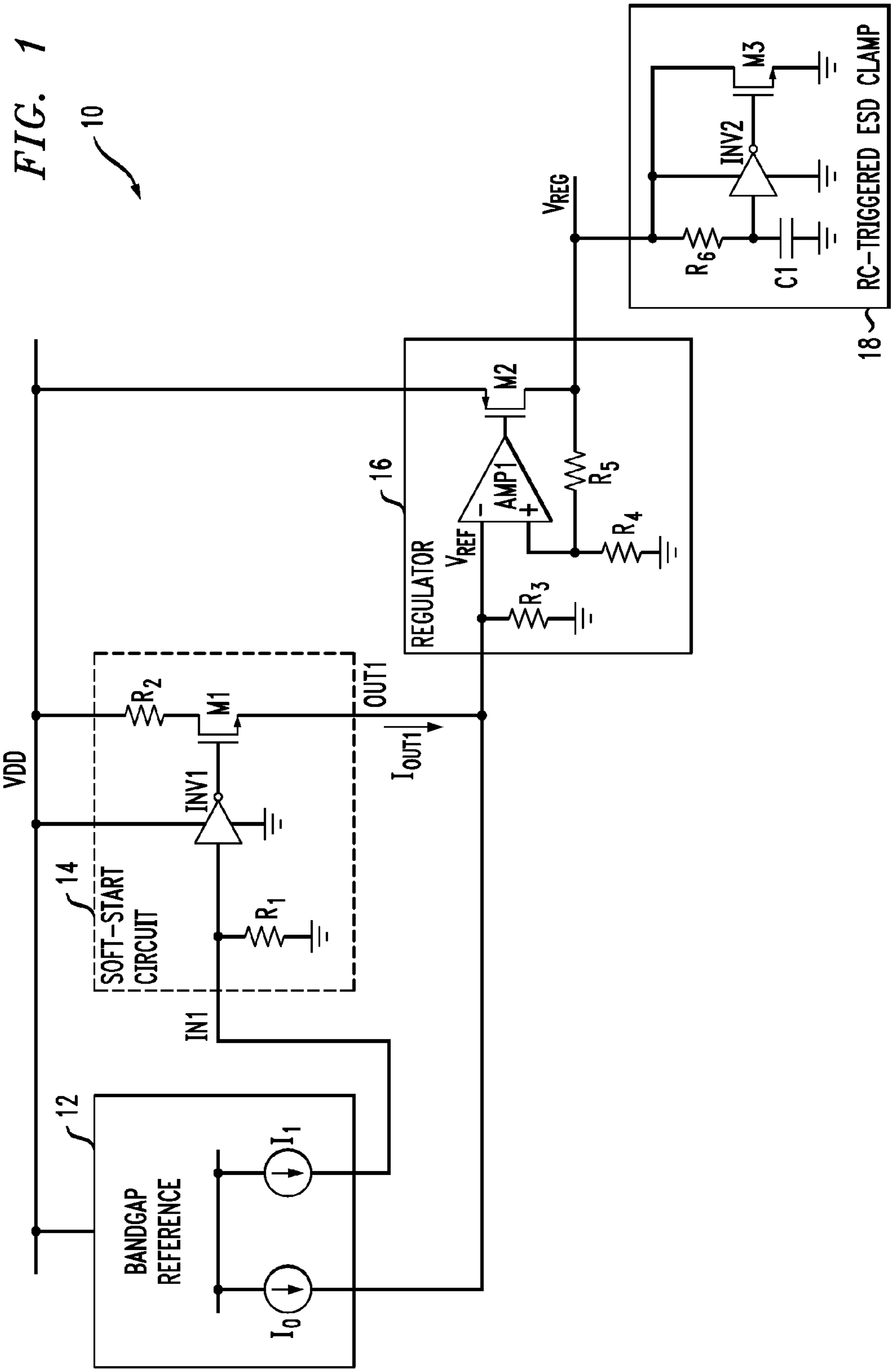
FIG. 1 shows a circuit architecture including a low area soft-start regulator circuit according to an embodiment of the invention.

FIG. 1 shows a circuit architecture including a low area soft-start regulator circuit according to an embodiment of the invention. As shown, circuit 10 includes a bandgap reference (current generator) 12 coupled to a soft-start (start-up) circuit 14 and a voltage regulator circuit 16, and an ESD clamp circuit 18 coupled to the voltage regulator 16.

The bandgap reference 12 is coupled to the supply voltage VDD and provides a current source I0 and mirrored current source I1 to the voltage regulator 16 and the soft-start circuit 14, respectively.

The voltage regulator 16 comprises operational amplifier AMP1, resistors R3, R4 and R5, and PMOS (positive or p-type metal oxide semiconductor) field effect transistor M2. More particularly, an input terminal to the voltage regulator 16, Vref, is coupled to a first (negative) terminal of AMP1 and a first terminal of resistor R3, and the second terminal of R3 is coupled to ground. Respective first terminals of resistors R4 and R5 are coupled to a second (positive) input terminal of AMP1. A second terminal of R4 is coupled to ground, and a second terminal of R5 is coupled to a drain terminal of transistor M2, which is also the output, Vreg, of the voltage regulator 16. An output terminal of AMP1 is coupled to a gate terminal of transistor M2. A source terminal of transistor M2 is coupled to input supply voltage VDD.

As shown, the Vref terminal to the voltage regulator 16 is coupled to the current source I0 from the bandgap reference 12 and to an output, OUT1, of the soft-start circuit 14, which will be described below. The voltage regulator 16 outputs Vreg for supplying a regulated voltage to a load circuit (not shown). The ESD clamp 18 is coupled to output Vreg of the voltage regulator 16 and is operable to protect the circuitry supplied by Vreg from an overvoltage condition.

The soft-start circuit 14 comprises resistors R1 and R2, inverter INV1, and native NMOS (negative or n-type metal oxide semiconductor) field effect transistor M1. Transistor M1 is referred to as a "native" transistor because the voltage threshold Vth is very low. It is to be understood that by a very low Vth, it is typically meant that the voltage threshold is a low positive voltage, zero volts, or a low negative voltage, whereby the transistor is turned on by applying a gate voltage at or above Vth, and turned off by applying a gate voltage below Vth.

It is to be appreciated that the soft-start circuit is not limited to use of a native NMOS device. That is, any suitable low threshold switch or device could be used in place of the native NMOS FET. By way of other examples only, an NPN device (such as bipolar junction transistor) or a JFET (junction gate FET) could be employed. Those ordinarily skilled in the art will realize other suitable devices that could be employed.

The soft-start circuit 14 is coupled to supply voltage VDD and includes an input IN1 operable to receive mirrored current source I1 from the bandgap reference 12 and an output OUT1 operable to provide a current signal to input Vref of the voltage regulator 16.

More particularly, as shown in soft-start circuit 14 of FIG. 1, an input terminal of inverter INV1 and a first terminal of resistor R1 are coupled to the input IN1 of the soft-start circuit 14. A second terminal of R1 is coupled to ground. An output terminal of INV1 is coupled to a gate terminal of transistor M1. A drain terminal of M1 is coupled to a first terminal of resistor R2, and a second terminal of R2 is coupled to VDD. A source terminal of M1 serves as the output OUT1 of the soft-start circuit 14, and is coupled to Vref terminal of the voltage regulator 16.

ESD clamp 18 is coupled to the voltage Vreg (output from voltage regulator 16) and comprises resistor R6, capacitor C1, inverter INV2 and NMOS field effect transistor M3. The ESD clamp 18 is operable to protect the circuitry (not shown) supplied by Vreg from an overvoltage condition.

More particularly, a first terminal of resistor R6, a voltage supply terminal of inverter INV2, and a drain terminal of transistor M3 are coupled to the output Vreg of the voltage regulator 16. A second terminal of R6 is coupled to an input terminal of INV2 and a first terminal of capacitor C1. A second terminal of C1 is coupled to ground. An output terminal of INV2 is coupled to a gate terminal of M3, and a source terminal of M3 is coupled to ground.

If voltage Vreg transitions at a relatively fast rate from a low voltage to a high voltage, i.e., faster than the time constant created by resistor R6 and capacitor C1, the output of inverter INV2 will follow the transition of voltage Vreg, thereby turning on transistor M3. Transistor M3 will then clamp the transient voltage on voltage Vreg. Thus, in order to prevent transistor M3 from unintentionally turning on (falsely triggering the overvoltage protection) during start-up, the ramp rate of voltage Vreg must be limited. This is accomplished by soft-start circuit 14.

Figure 2:
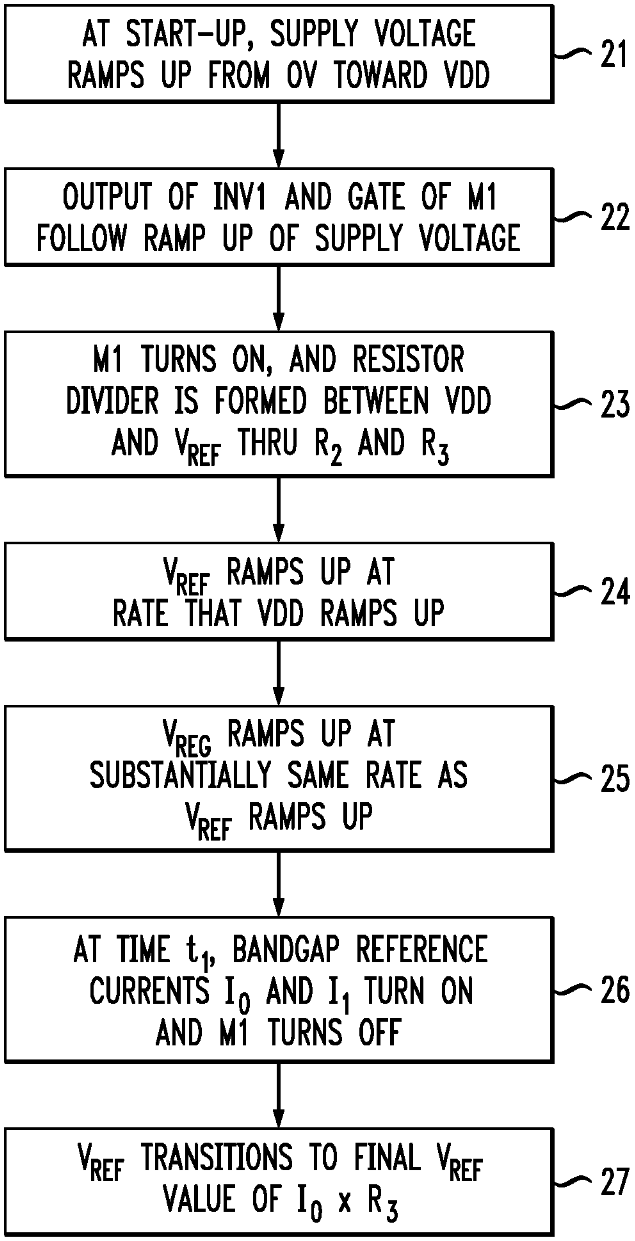
FIG. 2 shows a methodology for soft-starting a voltage regulator according to an embodiment of the invention.

FIG. 2 shows a methodology for soft-starting a regulator according to an embodiment of the invention. That is, the methodology 20 of FIG. 2 depicts the operation of circuit 10 of FIG. 1.

At start-up, the supply voltage begins to ramp up from 0 Volts (V) rising toward VDD (step 21). Note that the phrase "at start-up" refers to the onset of a start-up period (a period defined by a time t0 and a time t1, see FIG. 3), the start-up period being the time period when the supply voltage VDD is powered on (t0), and begins to rise (ramp) from 0V toward VDD, to a time (t1) when the bandgap reference generator turns on. Initially, during the start-up period, the bandgap reference currents I0 and I1 remain at zero Amps (A). With zero current from reference currents I0 and I1, the input voltage of soft-start circuit 14 remains at 0V since no current flows thru input resistor R1. The output of inverter INV1 and gate of native transistor M1 of soft-start circuit 14 will follow the ramp up of supply voltage VDD (step 22). Since native transistor M1 has a very low Vth, transistor M1 will be turned on (when its gate voltage reaches/surpasses Vth) and form a resistor divider between VDD and voltage regulator input Vref thru resistors R2 and R3 (step 23). Thus, IOUT1 (current signal output by soft-start circuit 14) is equal to (VDD−VDS (M1))/(R2+R3), where VDS is the drain-source voltage across M1. In response to IOUT1, Vref will slowly ramp up at the rate that VDD ramps up (step 24). Also, the output voltage Vreg of voltage regulator 16 will slowly ramp up to a value determined by amplifier AMP1, transistor M2 and feedback resistors R4 and R5 (step 25). The ramp-up rate of Vreg is substantially the same as the ramp-up rate of Vref, which is substantially the same as the ramp up rate of VDD.

As the supply voltage (VDD) ramps up during the start-up period, VDD will reach a large enough value (at a given time t1, see FIG. 3) and the bandgap reference 12 will turn on and, in a fast transition, provide reference currents I0 and I1. As reference current I1 turns on, a voltage is generated across resistor R1 of soft-start circuit 14 thereby turning off transistor M1 (step 26) since the gate voltage of transistor M1 is now driven low and since M1's source and drain voltages are much greater than Vth. The input Vref of voltage regulator 16 will now transition (up or down, depending on the value of R2 and R3) to the final Vref value of I0*R3 (step 27). This final transition can be fast due to the fast turn on of reference current I0.

Accordingly, it is to be noted that, since the initial ramp-up of Vref is slow and steady, Vreg advantageously ramps from zero volts, to the minimum voltage that can falsely trigger the ESD clamp, then continues slowly past the minimum voltage that can falsely trigger the ESD clamp such that a false trigger of the ESD clamp does not occur. Vreg is equal to K*I0*R3, where K is the gain of AMP1.

It is to be understood that by the use of the phrase "substantially the same" (or "substantially equal"), as used herein, it is meant that the ramp up rates of VDD, Vref and Vreg do not have to be exactly the same (although they can be) to realize the benefits of the invention, but rather they can be similar and/or proportional. Given the teachings described herein, one of ordinary skill in the art will realize that the ramp up rates can be controlled and set by the selection of circuit components with certain characteristics. Thus, principles of the invention are not limited to any specific ramp up rates but rather what is intended is that Vreg ramps steadily and slowly enough past the minimum voltage that can falsely trigger the ESD clamp such that a false trigger of the ESD clamp does not occur. What that rate is will depend on the specific components of the type of ESD clamp that is used with the voltage regulator.

Further, it is to be appreciated that the ramp rate at Vref could be varied during the start-up period whereby Vref ramps up at a first (faster) rate for a first period of time, and then at a second (slower) rate for a second period of time. Thus, Vref could be ramped at a faster rate from t0 until Vreg closely approaches, but does not reach, the minimum voltage that can falsely trigger the ESD clamp, at which time Vref is adjusted/controlled to ramp at a slower rate such that a false trigger of the ESD clamp does not occur as Vreg reaches and passes the minimum false trigger voltage. Such variable rate control could be affected at any suitable location in the circuit 10. One of ordinary skill in the art will appreciate how to implement such a variable ramp rate in a straightforward manner, given the inventive teachings herein. It is to be understood that such a variable ramp rate of Vref is considered to be consistent with, and covered by, the generalization that Vref ramps up at a rate substantially equal to (or substantially the same as) a ramp-up rate of VDD.

Figure 3:
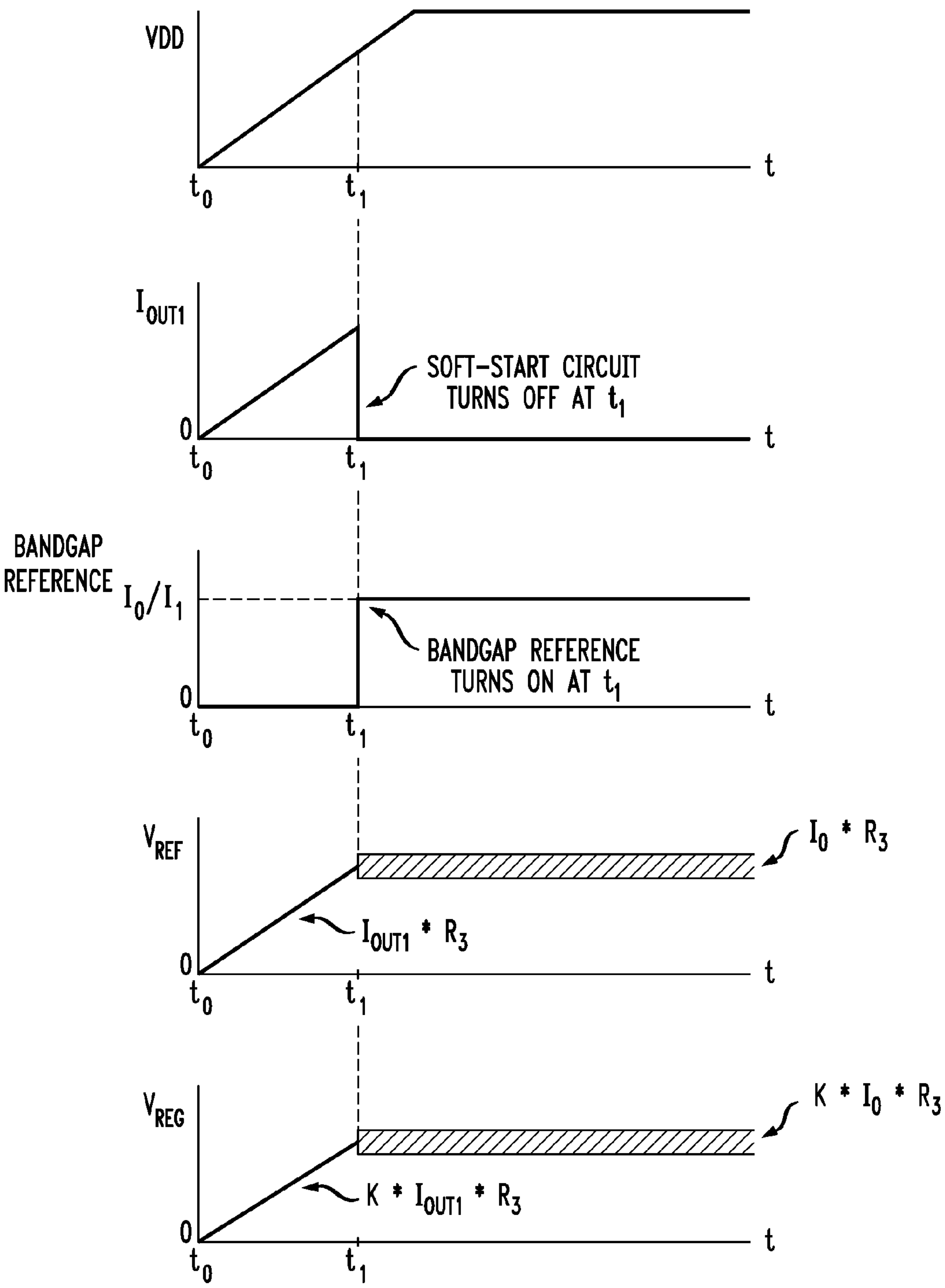
FIG. 3 shows a timing diagram associated with a circuit architecture including a low area soft-start regulator circuit according to an embodiment of the invention.

FIG. 3 shows a timing diagram depicting signals VDD, IOUT1, I0/I1, Vref and Vreg associated with circuit 10 and methodology 20, as respectively described above in the context of FIGS. 1 and 2.

Figure 4:
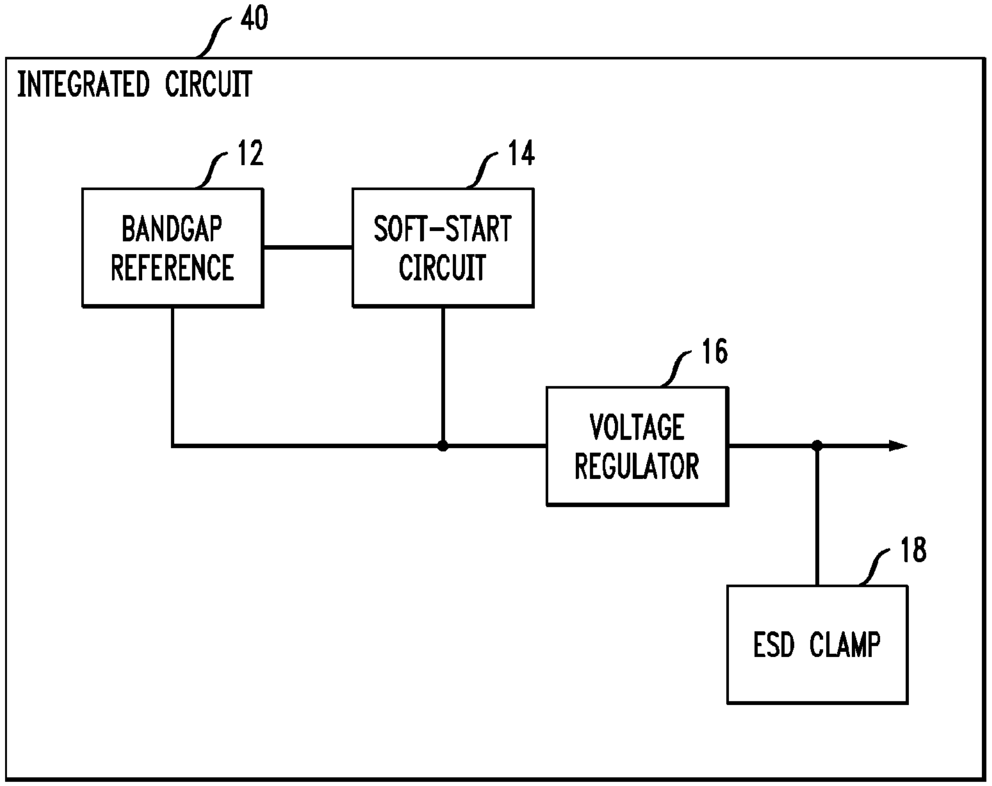
FIG. 4 shows an integrated circuit including a voltage regulator circuit and a low area soft-start regulator circuit according to an embodiment of the invention.

FIG. 4 illustrates an integrated circuit 40 in which the circuits (12, 14, 16 and 18) of FIG. 1 are formed. It is to be appreciated that, in an integrated circuit implementation of the invention, such as that shown in FIG. 4, one or more integrated circuit dies are typically formed in a pattern on a surface of a wafer. Each such die may include a device comprising circuitry as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention. While circuits 12, 14, 16 and 18 are shown in FIG. 4 as being formed in one integrated circuit, it is to be understood that the circuits can be formed across multiple integrated circuits.

It is to be further appreciated that by doing away with a need for a capacitor in the soft-start circuit, which tends to be large in physical circuit space area, the overall circuit space area of the soft-start circuit (and thus voltage regulator circuit) of the invention is advantageously decreased. Thus, the soft-start circuit of the invention provides a low area solution as compared with capacitor based and other existing soft-start approaches.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus comprising: a voltage regulator circuit; and a start-up circuit operatively coupled to the voltage regulator circuit and configured to provide a current signal, during a start-up period, that generates a reference voltage at a reference input of the voltage regulator circuit such that the reference voltage ramps up, during the duration of the start-up period, at a rate substantially equal to a ramp-up rate of a supply voltage coupled to the start-up circuit and the voltage regulator circuit, wherein the start-up period is a time period comprising a time when the supply voltage is powered on and begins to ramp up to a time when the start-up circuit turns off.

2. The apparatus of claim 1, wherein the voltage regulator circuit is configured such that, in response to the ramp up of the reference voltage at the reference input of the voltage regulator circuit, a regulator voltage at an output of the voltage regulator circuit ramps up at a rate substantially equal to the ramp-up rate of the reference voltage.

3. The apparatus of claim 2, further comprising a reference current generator operatively coupled to the voltage regulator circuit and the start-up circuit and configured to, at a given time during the start-up period, provide a current signal to the voltage regulator circuit and turn off the start-up circuit.

4. The apparatus of claim 3, further comprising an overvoltage protection circuit operatively coupled to the output of the voltage regulator circuit, wherein the regulator voltage ramps up at a rate such that the overvoltage protection circuit does not falsely trigger during the start-up period.

5. An apparatus comprising:

a voltage regulator circuit; and a start-up circuit operatively coupled to the voltage regulator circuit and configured to provide a current signal, during a start-up period, that generates a reference voltage at a reference input of the voltage regulator circuit such that the reference voltage ramps up at a rate substantially equal to a ramp-up rate of a supply voltage coupled to the start-up circuit and the voltage regulator circuit;

wherein the start-up circuit further comprises a transistor having a low threshold voltage that turns on initially during a start-up period when the supply voltage starts to ramp up and turns off when a reference current generator turns on.

6. The apparatus of claim 5, wherein the transistor is a native n-type field effect transistor.

7. The apparatus of claim 5, wherein the start-up circuit further comprises an inverter coupled between the reference current generator and the transistor.

8. The apparatus of claim 7, wherein the start-up circuit further comprises a first resistor coupled between an input of the inverter and ground.

9. The apparatus of claim 8, wherein the start-up circuit further comprises a second resistor coupled between the supply voltage and the transistor.

10. The apparatus of claim 9, wherein an output signal from the inverter is provided to a gate of the transistor turning on the transistor during the start-up period such that current flows through the second resistor and the transistor and forms the current signal that generates the reference voltage at the reference input of the voltage regulator circuit.

11. The apparatus of claim 10, wherein a voltage is generated across the first resistor when the reference current generator turns on thereby turning off the transistor.

12. An integrated circuit comprising: a first portion of the integrated circuit forming a voltage regulator circuit; and a second portion of the integrated circuit forming a start-up circuit operatively coupled to the voltage regulator circuit and configured to provide a current signal, during a start-up period, that generates a reference voltage at a reference input of the voltage regulator circuit such that the reference voltage ramps up, during the duration of the start-up period, at a rate substantially equal to a ramp-up rate of a supply voltage coupled to the start-up circuit and the voltage regulator circuit, wherein the start-up period is a time period comprising a time when the supply voltage is powered on and begins to ramp up to a time when the start-up circuit turns off.

13. The integrated circuit of claim 12, wherein the voltage regulator circuit is configured such that, in response to the ramp up of the reference voltage at the reference input of the voltage regulator circuit, a regulator voltage at an output of the voltage regulator circuit ramps up at a rate substantially equal to the ramp-up rate of the reference voltage.

14. The integrated circuit of claim 13, further comprising a third portion of the integrated circuit forming a reference current generator operatively coupled to the voltage regulator circuit and the start-up circuit and configured to, at a given time during the start-up period, provide a current signal to the voltage regulator circuit and turn off the start-up circuit.

15. The integrated circuit of claim 14, further comprising a fourth portion of the integrated circuit forming an overvoltage protection circuit operatively coupled to the output of the voltage regulator circuit, wherein the regulator voltage ramps up at a rate such that the overvoltage protection circuit does not falsely trigger during the start-up period.

16. A soft-start circuit for a voltage regulator, the circuit comprising:

a transistor having a low threshold voltage that turns on initially during a start-up period when a supply voltage starts to ramp up and turns off when a reference current generator turns on;

an inverter coupled between the reference current generator and the transistor;

a first resistor coupled between an input of the inverter and ground; and a second resistor coupled between the supply voltage and the transistor;

wherein an output signal from the inverter is provided to a gate of the transistor turning on the transistor during the start-up period such that current flows through the second resistor and the transistor and forms the current signal that generates a reference voltage at a reference input of the voltage regulator, and wherein a voltage is generated across the first resistor when the reference current generator turns on thereby turning off the transistor.

17. A method comprising: generating a current signal at a start-up circuit, during a start-up period, causing generation of a reference voltage at a reference input of a voltage regulator circuit such that the reference voltage ramps up, during the duration of the start-up period, at a rate substantially equal to a ramp-up rate of a supply voltage coupled to the start-up circuit and the voltage regulator circuit, wherein the start-up period is a time period comprising a time when the supply voltage is powered on and begins to ramp up to a time when the start-up circuit turns off.

18. The method of claim 17, wherein, in response to the ramp up of the reference voltage at the input of the voltage regulator circuit, a regulator voltage at an output of the voltage regulator circuit ramps up at a rate substantially equal to the ramp-up rate of the reference voltage.

19. The method of claim 18, further comprising generating a reference current signal that is provided to the voltage regulator circuit and turns off the start-up circuit.

20. The method of claim 19, wherein the regulator voltage ramps up at a rate such that an overvoltage protection circuit coupled to the voltage regulator circuit does not falsely trigger during the start-up period.

* * * * *